US006590574B1

(12) United States Patent
Andrews (10) Patent No.: US 6,590,574 B1
(45) Date of Patent: Jul. 8, 2003

(54) METHOD, SYSTEM, AND COMPUTER PROGRAM PRODUCT FOR SIMULATING CAMERA DEPTH-OF-FIELD EFFECTS IN A DIGITAL IMAGE

(75) Inventor: Thayer J. Andrews, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/572,452

(22) Filed: May 17, 2000

(51) Int. Cl.[7] .............................................. G06T 17/00
(52) U.S. Cl. ....................................................... 345/419
(58) Field of Search ................................. 345/418, 419, 345/420, 421, 422, 581, 582, 587

(56) References Cited

U.S. PATENT DOCUMENTS 6,038,031 A * 3/2000 Murphy ....................... 345/582

OTHER PUBLICATIONS

Angel, E. "Interactive Computer Graphics: A Top–Down Approach with OpenGL™," Addison–Wesley Publishing Co., Reading, Mass., 1997, title page, table of contents, and pp. 420–423.
Foley et al., "Computer Graphics Principles and Practice," Addison–Wesley Publishing Co., Reading, Mass., 2nd edition, 1996, title page, table of contents, and pp. 614–615, 774–775, and 789.
Gonzalez et al., "Digital Image Processing," Addison–Wesley Publishing Co., Reading, Mass., 2nd edition, 1987, title page, table of contents and pp. 161–175.

Haeberli et al., "The Accumulation Buffer: Hardware Support for High–Quality Rendering," in *Computer Graphics* (*Proceedings of SIGGRAPH 90*), vol. 24, No. 4, Aug. 1990, pp. 309–318.
Korein et al., "Temporal Anti–Aliasing in Computer Generated Animation," in *Computer Graphics* (*Proceedings of SIGGRAPH 83*), vol. 17, No. 3, Jul. 1983, pp. 377–388.
Potmesil et al., "Modeling Motion Blur in Computer–Generated Images," in *Computer Graphics* (*Proceedings of SIGGRAPH 83*), vol. 17, No. 3, Jul. 1983, pp. 389–399.
Potmesil et al., "Synthetic Image Generation with a Lens and Aperture Camera Model," *ACM Transactions on Graphics*, vol. 1, No. 2, Apr. 1982, pp. 85–108.
Strauss et al., "An Object–Oriented 3D Graphics Toolkit," *Computer Graphics*, vol. 26, No. 2, Jul. 1992, pp. 341–349.
Woo et al., "OpenGL Programming Guide," Addison–Wesley Longman, Inc., Reading, Mass., 3rd edition, 1999, title page, table of contents and pp. 450–465.

* cited by examiner

*Primary Examiner*—Cliff N. Vo
(74) *Attorney, Agent, or Firm*—Woodcock Washburn LLP (57) ABSTRACT

Camera depth-of-field effects are simulated through a system and method that blurs at least a portion of an image. A source image having a plurality of pixels is transferred to a frame buffer. Either during the transfer or after the transfer, a blending factor is determined for each pixel of the source image. A blurred copy of the source image is generated using hardware, software, or a combination of hardware and software. The blurred copy of the source image is then blended with the source image using the determined blending factors to produce an image having simulated camera depth-of-field effects.

24 Claims, 9 Drawing Sheets

METHOD, SYSTEM, AND COMPUTER PROGRAM PRODUCT FOR SIMULATING CAMERA DEPTH-OF-FIELD EFFECTS IN A DIGITAL IMAGE

CROSS REFERENCE TO RELATED APPLICATION

The following application of common assignee is related to the present application, and is herein incorporated by reference in its entirety:

"A Method, System, and Computer Program Product for Generating Spatially Varying Effects in A Digital Image," Ser. No. 09/461,345, filed Dec. 15, 1999.

BACKGROUND OF THE INVENTION

1. Field of the Invention

The present invention relates to computer graphics. More particularly, it relates to simulating camera depth-of-field effects in a digital image.

2. Related Art

In computer graphics, camera depth-of-field effects are important effects that contribute to the overall realism of digital images. Camera depth-of-field effects add to the realism of digital images because only one plane in a real image, the focal plane, can be in focus at any given instance in time. The farther an object is located from the focal plane in a real image, the more out of focus or blurry it appears to an observer. Being able to quickly generate a sequence of digital images having camera depth-of-field effects is particularly important, especially in computer animation.

Conventionally, digital images having camera depth-of-field effects have been generated by combining several copies of an object to be blurred into a single image. A stationary object in a digital image would be blurred to simulate camera depth-of-field effects, for example, by generating several slightly displaced copies of the object and blending the pixels of these copies of the object to form a single blurred image of the object. This conventional method for simulating camera depth-of-field effects in digital images is highly dependent on scene complexity and geometric complexity, as are other known conventional methods. While conventional methods for simulating camera depth-of-field effects in digital images are useful in certain circumstances, the known conventional methods cannot be implemented at interactive rates on graphics machines.

What is needed is a method, system, and computer program product for simulating camera depth-of-field effects in a digital image at an interactive rate.

SUMMARY OF THE INVENTION

The present invention provides a method, system, and computer program product for simulating camera depth-of-field effects in an image. A source image having a plurality of pixels is transferred to a frame buffer. Either during the transfer or after the transfer, a blending factor is determined for each pixel of the source image. A blurred copy of the source image is generated using hardware, software, or a combination of hardware and software. The blurred copy of the source image is then blended with the source image using the determined blending factors to produce an image having simulated camera depth-of-field effects.

In an embodiment, the depth component for each of the source image pixels is used as the blending factor for each of the pixels. In another embodiment, the blending factor for each of the pixels is calculated based upon the depth component of each of the pixels. In still another embodiment, the blending factor for each of the pixels of the source image is obtained from a look-up table using the depth component of each of the pixels of the source image.

In an embodiment, the blurred copy of the source image is generated by operating on the pixels of the source image with a box filter. In another embodiment, the source image is operated on with a Gaussian filter.

According to a further feature, the present invention can be implemented on a wide range of machines including, but not limited to, low-end game systems. For example, the present invention provides camera depth-of-field effects even on a low-end game machine that does not have 3-D texturing or an accumulation buffer.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the relevant art(s) to make and use the invention.

The present invention is described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

Overview and Terminology

The present invention provides a method, system, and computer program product for simulating camera depth-of-field effects in an image. The present invention can be implemented at an interactive rate on a wide range of computers or computer-like systems, including low-end game systems because it does not require three-dimensional texture or an accumulation buffer to simulate camera depth-of-field effects in an image.

As used herein, the term "digital image" or "image" means an array of pixels. A typical image might have red, green, blue, and alpha pixel data, or other type pixel data information as known to a person skilled in the relevant art.

The term pixel means a data structure, which is used to represent a picture element. Any type of pixel format can be used.

The term "interactive rate" refers to a rate at which successive display images can be redrawn without undue delay upon a user or application. This interactive rate can include, but is not limited to, a rate equal to or less than approximately 120 milliseconds. In one preferred example, an interactive rate is equal to or less than 60 milliseconds.

Example Systems for Simulating Camera Depth-of-Field Effects in an Image

Figure 1:
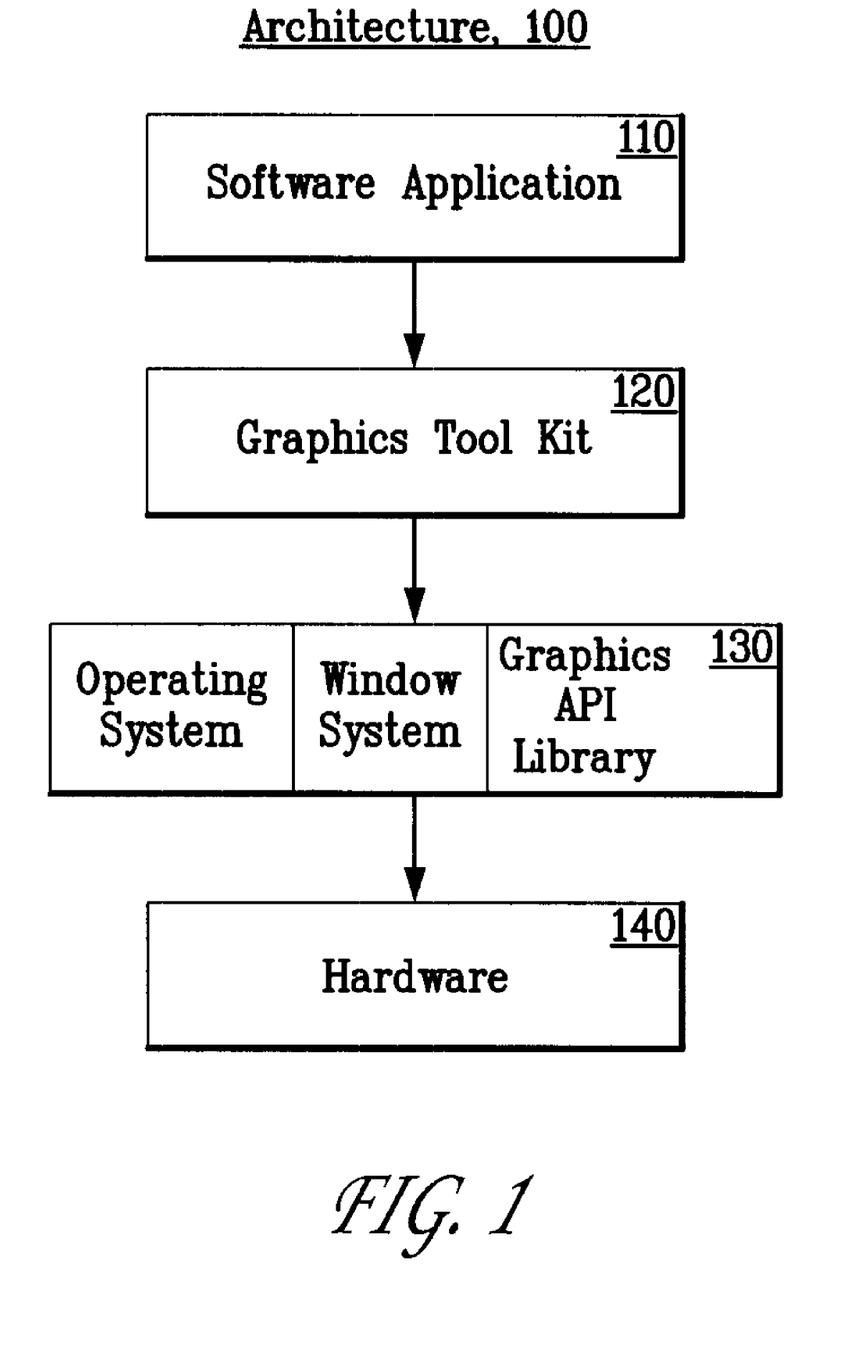
FIG. 1 illustrates an example embodiment of a computer architecture in which the present invention can be implemented.

It is a feature of the present invention that it may be implemented in many different ways, in many environments, and on many different computers or computer-like systems. For example, FIG. 1 illustrates a block diagram of an example computer graphics architecture 100 in which the present invention can be implemented. As would be apparent to a person skilled in the relevant art given this description, the present invention can be implemented in any one of the layers 110–140 of architecture 100, or in any combination of layers 110–140 of architecture 100.

Architecture 100 includes four layers. Layer 110 represents a high level software application. Layer 120 represents a three-dimensional (3D) graphics software tool kit, such as Open Inventor™. For an explanation of an example 3D graphics tool kit and how it is used, see Strauss el al., An Object-Oriented 3D graphics Tool Kit, Computer Graphics, 26(2) July 1992, pp. 341–349, incorporated in its entirety herein by reference. Layer 130 represents a graphics application program interface (API), which can include but is not limited to OPENGL, and/or other system support such as operating system and windowing system support. Finally, layer 140 represents hardware, including graphics hardware. Hardware 140 can be any hardware, graphics hardware, or graphics pipeline including but not limited to, a computer graphics processor (single chip or multiple chip), a specially designed computer, an interactive graphics machine, a gaming platform, a low end game system, a game console, a network architecture, et cetera. Some or all of the layers 110–140 of architecture 100 will be available in any computer or computer-like system.

Figure 2:
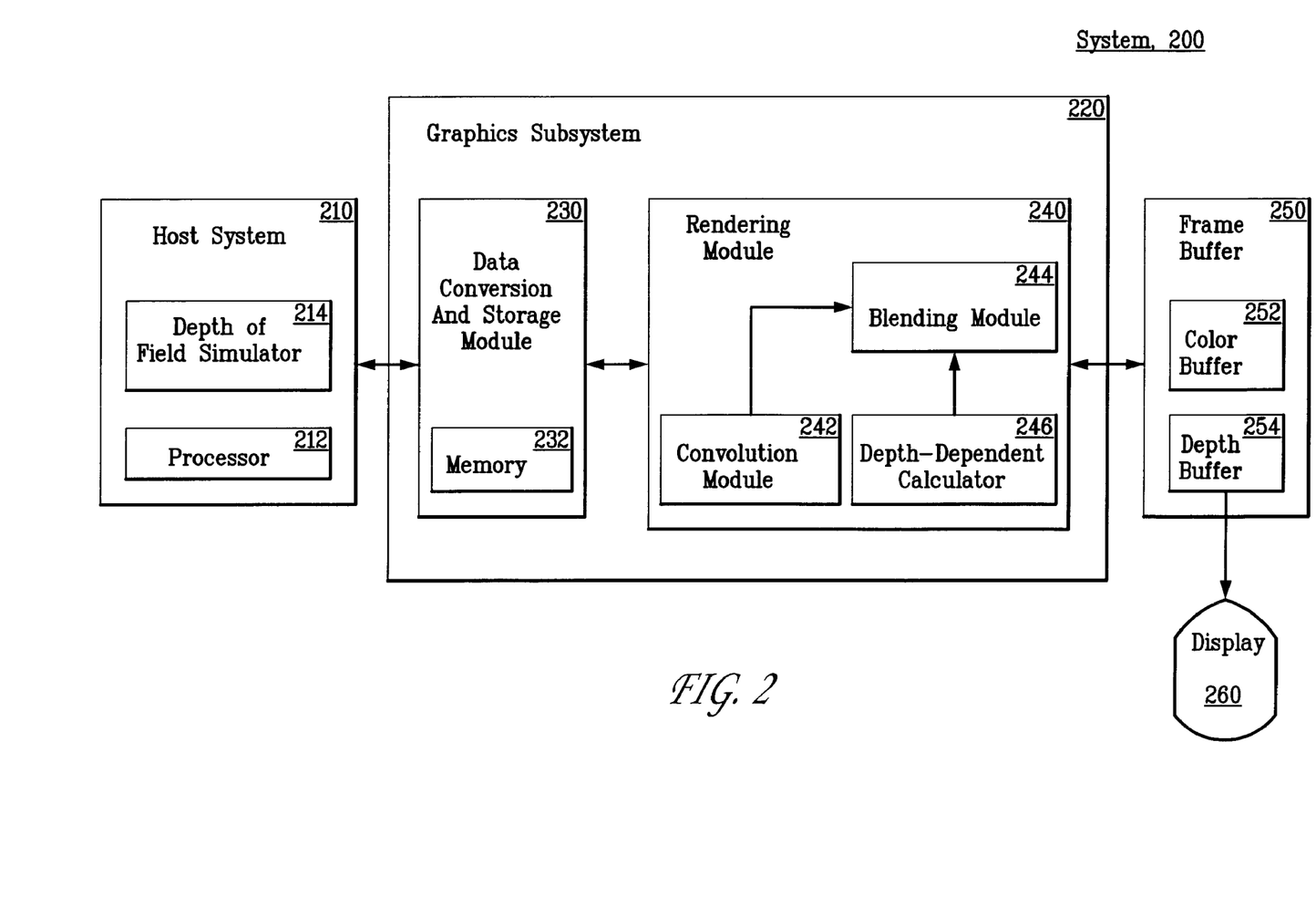
FIG. 2 illustrates a block diagram of an example embodiment of an interactive computer or computer-like system according to the present invention.

FIG. 2 illustrates an example embodiment of an interactive computer or computer-like system 200, which can be used to simulate camera depth-of-field effects in an image according to a method 400 of the present invention. System 200 includes a host system 210, a graphics subsystem 220, a frame buffer 250, and a display 260.

Host system 210 represents any computer or computer-like environment that processes images. Host system 210 comprises a processor 212 and a depth-of-field simulator 214.

Processor 212 represents any processor (single chip or multiple chip). Processor 212 is a central component of system 200, and its function is to execute instructions. Processor 212 can be, for example, either a complex instruction set computer that is capable of executing a large number of complicated instructions or a reduced instruction set computer that is capable of executing only a small number of simple instructions.

Depth-of-field simulator 214 is a module that controls the operation of graphics subsystem 220 and the storage and retrieval of pixels (i.e., data) from frame buffer 250. In an embodiment of system 200, depth-of-field simulator 214 is a software program. For example, depth-of-field simulator 214 can be a soft program that uses or is compiled using a software application that resides at level 110 of architecture 100, a graphics tool kit that resides at level 120 of architecture 100, and a graphics API that reside at level 130 of architecture 100. Flow to write a software program to implement depth-of-field simulator 214 will be apparent to a person skilled in the relevant art given the description of the invention contained herein.

Graphics subsystem 220 comprises a data conversion and storage module 230 and a rendering module 240. In one embodiment of the present invention, graphics subsystem 220 resides on a computer graphics card in other embodiments, graphics subsystem 220 can reside, for example, in application specific integrated circuits that form a part of a computer-like system such as a hand-held video game system. The functions of the various modules of graphic subsystem 220 can be performed using hardware, firmware, software, or a combination thereof The function of data conversion and storage module 230 is to receive an image from host system 210 and convert the image to a data format that can be used by the other modules of graphics subsystem 220. Images are typically stored in host system 210 in a compressed data format. Images are stored in host system 210 in a compressed data format in order to reduce the amount of memory needed to store an image. Therefore, before an image can be processed by graphics subsystem 220, the format of the image must be converted to a format that can be used by the various modules of graphics subsystem 220. Data conversion and storage module 230 has a memory module 232 that can store one or more images.

In some embodiments, host system 210 converts images to a data format that can be used by the modules of graphics subsystem 220. In these embodiments, there is no need to for data conversion and storage module 230 to convert the images to a data format that can be used by the other modules of graphics subsystem 220.

Rendering module 240 comprises a convolution module 242, a blending module 244, and a depth-dependent calculator 246. The function of rendering module 240 is to add a variety of detailed effects to an image, such as spatially varying effects that can simulate camera depth-of-field effects. Rendering module 240 can add detailed effects to an image received from either data conversion and storage module 230 or frame buffer 250. In an embodiment, convolution module 242 produces a blurred image by operating upon the pixels of a source image with either a box filter or a Gaussian filter. The present invention is not limited to just box filters or Gaussian filters, however, as will be apparent to a person skilled in the relevant art given the discussion herein. The amount of blurring produced in the blurred image is determined by the filter used to operate upon the pixels of the source image. Depth dependent calculator 246 calculates a blending factor, which is dependent upon the depth of a pixel in a scene. Blending module 244 is used to blend the blurred image produced by convolution module 242 with an image stored in frame buffer 250. The amount of blending that occurs is based on a blending factor determined by depth-dependant calculator 246. How the blending factor is determined is discussed below in regards to FIG. 4. In addition to adding spatially varying effects, rendering module 240 can also add additional effects to an image to simulate, for example, lighting sources and material properties.

Frame buffer 250 represent any memory used to store the pixels of a digital image. Frame buffer 250 comprises both a color buffer 252 and a depth buffer 254. Color buffer 252 stores pixel color data, such as red, green, blue, and alpha color data. Depth buffer 254 stores depth information. Frame buffer 250 can be memory located on a display card (not shown), or it can be a portion of processor memory (not shown). The purpose of frame buffer 250 is to store an image for display.

Display 260 is any display hardware capable of displaying an image, or a series of images, to a user. For example, display 260 can be a cathode-ray tube display, an active matrix display, or a liquid crystal display. Other types of displays that can be used will be known to a person skilled in the relevant art. Display 260 is used to display an image, or series of images, stored in frame buffer 250.

Figure 3:
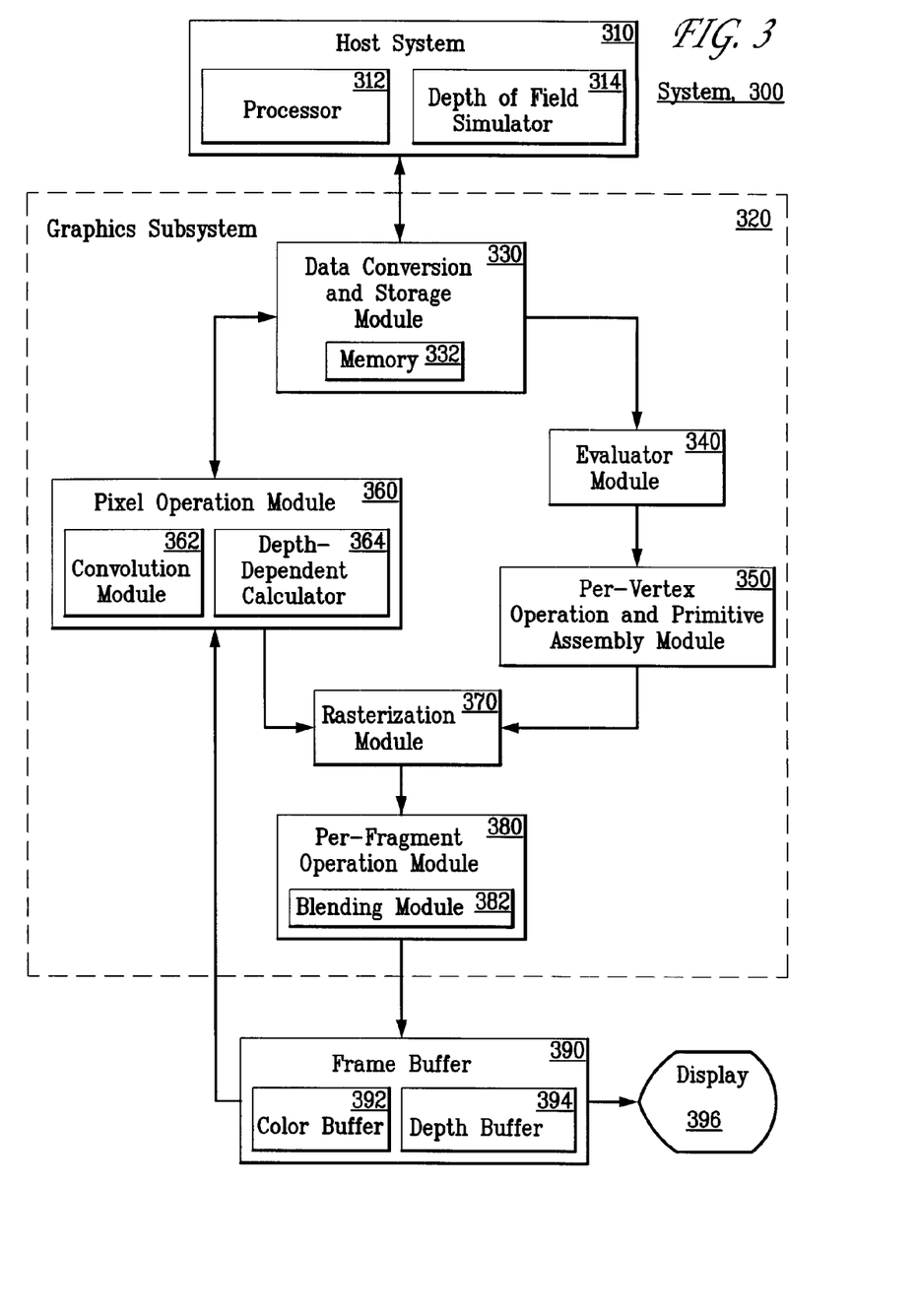
FIG. 3 illustrates a block diagram of a second example embodiment of an interactive computer or computer-like system according to the present invention.

Referring now to FIG. 3, a second example embodiment of an interactive computer or computer-like system 300 is illustrated, which can be used to simulate camera depth-of-field effects in an image according to method 400 of the present invention. System 300 includes a host system 310, a graphics subsystem 320, a frame buffer 390, and a display 396.

Host system 310 is similar to host system 210 in that host system 310 represents any computer or computer-like environment that processes images. Host system 310 comprises a processor 312 and a depth-of-field simulator 314. Processor 312 represents any processor (single chip or multiple chip). Processor 312 is a central component of system 300, and its function is to execute instructions. Processor 312 can be, for example, either a complex instruction set computer that is capable of executing a large number of complicated instructions or a reduced instruction set computer that is capable of executing only a small number of simple instructions.

Depth-of-field simulator 314 is a module that controls the operation of graphics subsystem 320 and the storage and retrieval of pixels (i.e., data) from frame buffer 350. In an embodiment of system 300, depth-of-field simulator 314 is a software program. For example, depth-of-field simulator 314 can be a soft program that uses or is compiled using a software application that resides at level 110 of architecture 100, a graphics tool kit that reside at level 120 of architecture 100, and graphics APIs that reside at level 130 of architecture 100. How to write a software program to implement depth-of-field simulator 314 will be apparent to a person skilled in the relevant act given the description of the invention contained below.

Graphics subsystem 320 comprises a data conversion and storage module 330, an evaluator module 340, a per-vertex operation and primitive assembly module 350, a pixel operation module 360, a rasterization module 370, and a per-fragment operation module 380.

The function of data conversion and storage module 330 is to receive an image from host system 310 and convert the image to a data format that can be used by the other modules of graphics subsystem 320. Images are typically stored in host system 310 in a compressed data format. Images are stored in host system 310 in a compressed data format in order to reduce the amount of memory needed to store an image. Therefore, before an image can be processed by graphics subsystem 320, the format of the image must be converted to a format that can be used by the various modules of graphics subsystem 320. Data conversion and storage module 330 has a memory module 332 that can store one or more images. In some embodiments, host system 310 converts images to a data format that can be used by the modules of graphics subsystem 320. In these embodiments, there is no need to for data conversion and storage module 330 to convert the images to a data format that can be used by the other modules of graphics subsystem 320.

Evaluator module 340 and per-vertex operation and primitive assembly module 350 convert the simplified data used to represent an image into data that can be used to displayed an image to a user. Evaluator module 340 generates vertex data that is used to represent the many different lines segments and polygons, such as triangles and quadrilaterals, that actually makeup an image from a smaller set of parameters that are used to represent the curves and/or surfaces of an image. Per-vertex operation and primitive assembly module 350 convert this vertex data into the line segments and polygons that actually makeup an image. As would be apparent to a person skilled in the relevant art, the geometric curves and surfaces of any image can be mathematically represented by a just a few parameters or control points. Thus, it is desirable to represent an image using only a limited number of representative parameters rather than the many different lines segments and polygons that actually makeup an image. Representing an image by just a limited number of representative parameters allows an image to be stored using less memory, and it simplifies programming. The limited number of parameters used to represent an image, however, must be transformed into the actual line segments and polygons that makeup an image before an image can be displayed to a user. This conversion is performed by evaluator module 340 and per-vertex operation and primitive assembly module 350.

Pixel operation module 360 comprises a convolution module 362 and a depth-dependent calculator 364. The function of pixel operation module 360 is to add a variety of detailed effects to an image, such as spatially varying effects that can simulate camera depth-of-field effects. Pixel operation module 360 can add detailed effects to an image received from either data conversion and storage module 330 or frame buffer 390. In an embodiment, convolution module 362 produces a blurred image by operating upon the pixels of a source image with either a box filter or a Gaussian filter. The present invention is not limited to just box filters or Gaussian filters, however, as will be apparent to a person skilled in the relevant art given the discussion herein. The amount of blurring produced in the blurred image is determined by the filter used to operate upon the pixels of the source image. In addition to adding spatially varying effects, pixel operation module 360 can also add additional effects to an image to simulate, for example, lighting sources and material properties.

Rasterization module 370 combines the output of per-vertex operation and primitive assembly module 350 and pixel operation module 360 to form image fragments. Image fragments correspond to pixels in frame buffer 390. Each fragment has both color values, such as red, green, blue, and alpha and a depth value.

Per-fragment operation module 380 operates on the fragments generated in rasterization module 370. For example, per-fragment operation module 380 determines which fragments from rasterization module 370 will be place in frame buffer 390. This determination is based on the various depths of the fragments generated by rasterization module 370. For example, a fragment that is hidden behind an opaque fragment will not be stored in its corresponding pixel location of frame buffer 390 because a hidden fragment cannot not be seen by a viewer. An important function of per-fragment operation module 380 is the blending of the fragments produced by rasterization module 370 with the pixels of an image stored in frame buffer 390. This blending function of per-fragment operation module 380 is carried-out by blending module 382.

Blending module 382 is used to blend the blurred image produced by convolution module 362 with an image stored in frame buffer 390. The amount of blending that occurs is based on a blending factor determined by depth-dependant calculator 364. How the blending factor is determined is discussed below in regards to FIG. 4.

Frame buffer 390 represents any memory used to store the pixels of a digital image. Frame buffer 390 comprises both a color buffer 392 and a depth buffer 394. Color buffer 392 stores pixel color data, such as red, green, blue, and alpha color data. Depth buffer 394 stores depth information. Frame buffer 390 can be memory located on a display card (not shown), or it can be a portion of processor memory (not show). The purpose of frame buffer 390 is to store an image for display.

Display 396 is any display hardware capable of displaying an image, or a series of images, to a user. For example, display 396 can be a cathode-ray tube display, an active matrix display, or a liquid crystal display. Other types of displays that can be used will be known to a person skilled in the relevant art. Display 396 is used to display an image, or series of images, stored in frame buffer 390.

Example Method for Simulating Camera Depth-of-Field Effects in an Image

Figure 4:
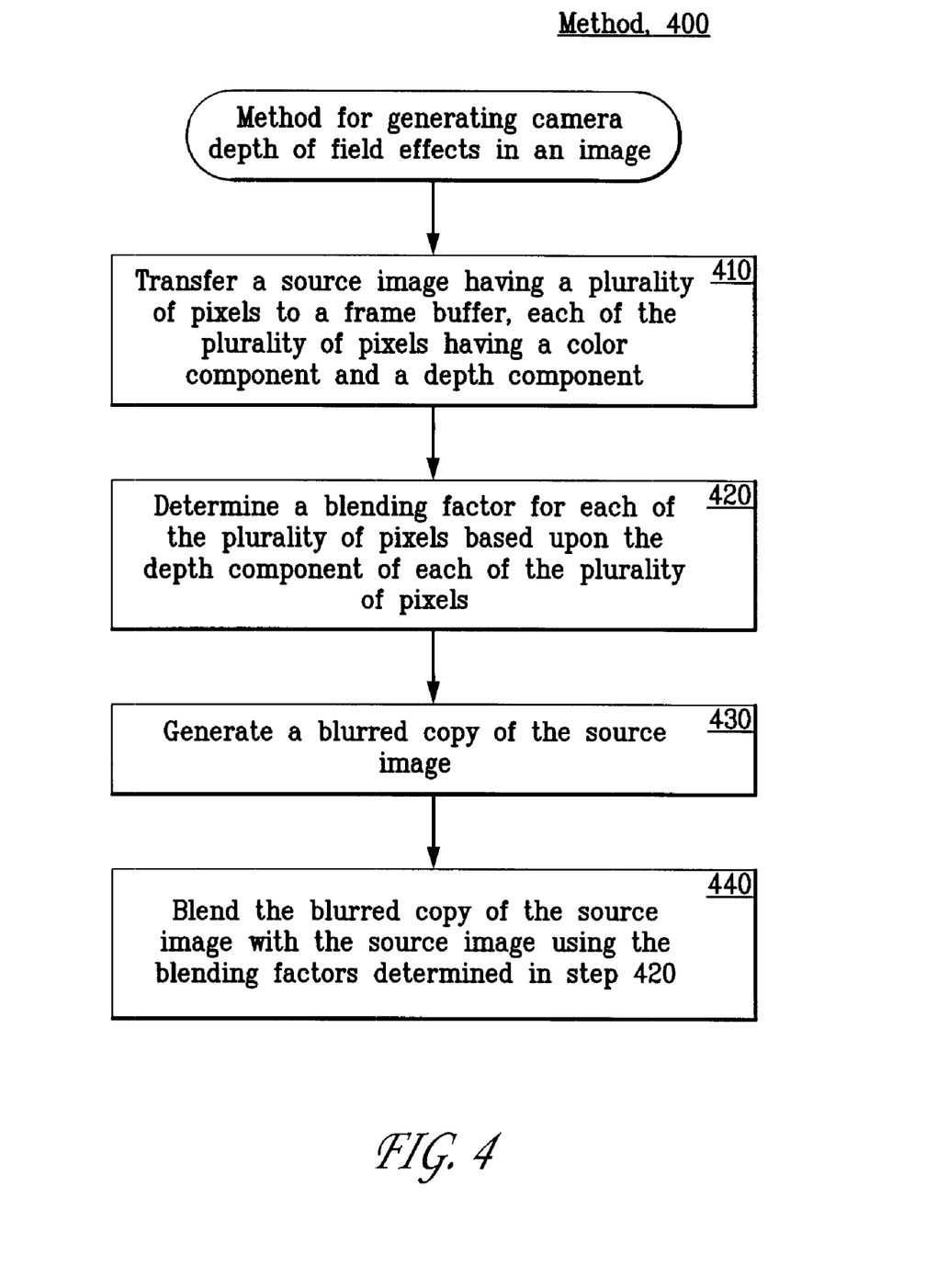
FIG. 4 illustrates a flowchart of a method for simulating camera depth-of-field effects in an image according to an embodiment of the present invention.

FIG. 4 illustrates a flowchart of a method 400 for simulating camera depth-of-field effects in an image according to an embodiment of the present invention. Generally speaking, method 400 simulates camera depth-of-field effects by blending a source image stored in a frame buffer with a cop), of the source image that has been purposefully blurred. In a photographic image, objects near the focal plane of the camera appear sharp and in focus. Objects far away from the camera's focal plane appear blurred and out of focus. By blending a source image with a blurred copy of the source image, it is possible to make certain objects in an image appear to be in focus while other objects appear to be out of focus. This effect can make an image projected on a two-dimensional display appear to be three-dimensional to an observer.

Method 400 comprises steps 410, 420, 430, and 440. Each of these four steps is described below with regard to system 300. As will be apparent to a person skilled in the relevant art, method 400 can be implemented on a variety of computer or computer-like systems, for example, architecture 100, system 200, a specially designed computer, an interactive graphics machine, a gaming platform, a low end game system, a game console, a network architecture, et cetera.

Referring to FIG. 4, method 400 starts at step 410. In step 410, a source image having a plurality of pixels is transferred to frame buffer 390.

Figure 5:
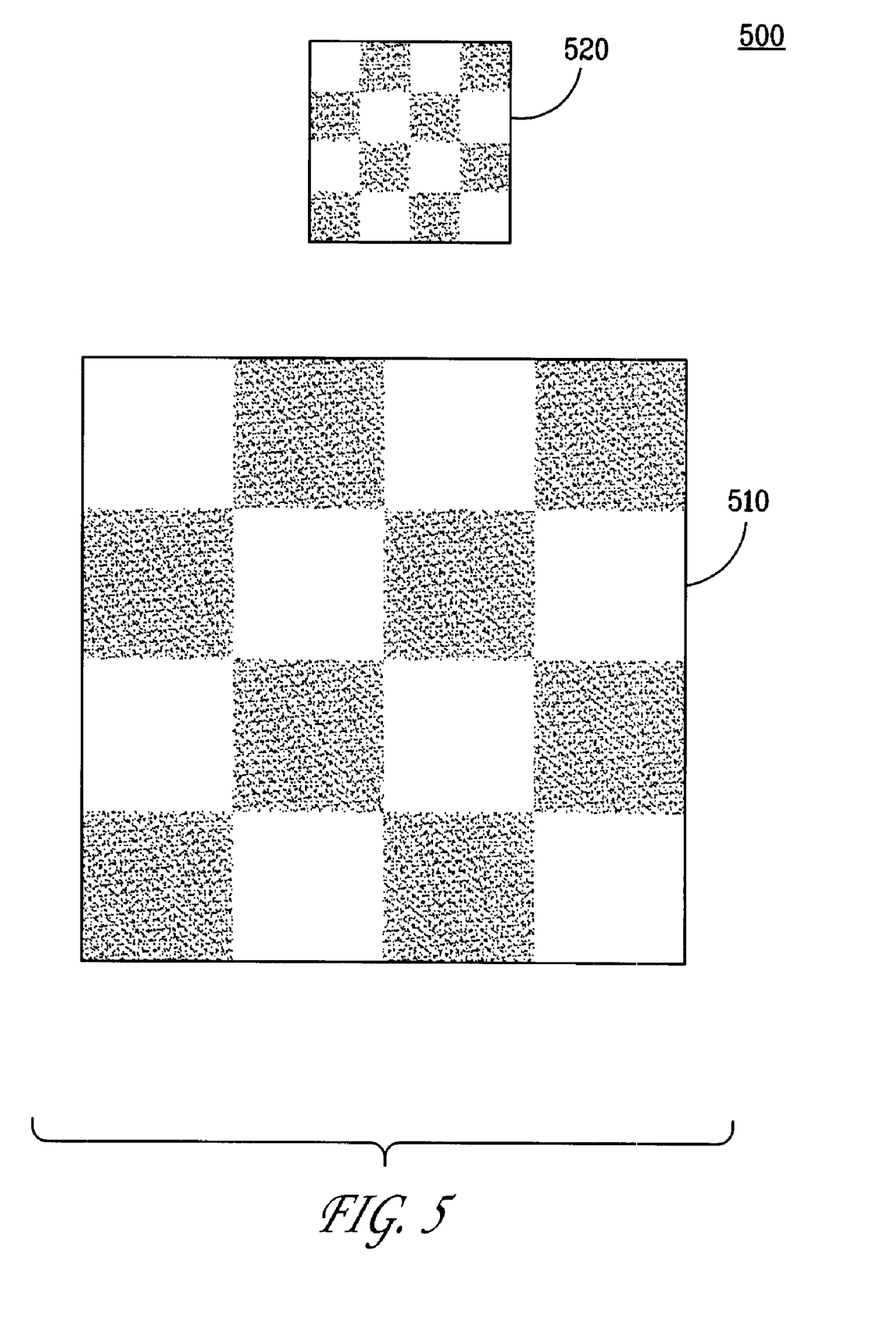
FIG. 5 illustrates an example source image in accordance with the present invention.

FIG. 5 illustrates an example source image 500, which might be transferred to frame buffer 390 in accordance with the present invention. Source image 500 comprises two sub-images 510 and 520. Sub-image 510 is a large square having a checker-board appearance. Sub-image 520 is a small square having a checker-board appearance. The pixels of source image 500 have both color and depth component values. The color and depth component values of source image 500 are floating-point numbers in the range of 0.0 to 1.0. An image having depth component values in the range of 0.0 to 0.1 is assumed to be close to the observer of the image. An image having depth component values in the range of 0.9 to 1.0 is assumed to be far from the observer of the image.

In step 410, source image 500 can be transferred to frame buffer 390 from either memory in host system 310 or from memory 332 of data conversion and storage module 330. The transfer of source image 500 to frame buffer 390 is controlled by depth-of-field simulator 314.

In step 420 of method 400, a blending factor for each of the pixels of source image 500 is determined based upon each pixel's depth component value. In an embodiment of the present invention, the blending factor for each component is determined using a lookup table. In this embodiment, depth-dependant calculator 364 looks up a blending factor for each pixel in a lookup table that contains a predetermined blending factor for each possible depth component value. Using a lookup table to determine a blending factor for each pixel of an image provides a great deal of flexibility, as will be apparent to a person skilled in the relevant art given the discussion herein. Depth-dependent calculator 364 is not limited to just looking up blending factors in a lookup table, however. In other embodiments of the present invention, depth-dependent calculator 364 can be a hardware-based processor that calculates a blending factor based on a preprogrammed algorithm-m or one or more run-time inputs from depth-of-field simulator 314.

In embodiments of the present invention, a blending factor for each pixel of source image 500 is determined as source image 500 is transferred from either host system 310 or memory 332 to frame buffer 390. As the pixels of source image 500 are transferred to frame buffer 390, they pass through pixel operation module 360. While the pixels are passing through pixel operation module 360, depth-dependant calculator 364 reads the depth-component value of each pixel and looks up a corresponding blending factor for each pixel. After the blending factor for a particular pixel is determined by depth-dependent calculator 364, the blending factor for the pixel is stored, for example, in the pixel's alpha color channel or buffer (e.g., the alpha component of color buffer 392). Thus, in one embodiment of the present invention, the blending factor for each pixel is determined as the image is transferred to frame buffer 390, and the blending factor for each pixel is store in frame buffer 390 as the alpha color component value of the image.

Alternatively, depth-dependent calculator 364 may reside in host system 310 rather than pixel operation module 360. In such embodiments, source image 500 might be transferred to frame buffer 390 in step 410 without the blending factor for each pixel being calculated and stored in frame buffer 390 as the alpha color component value of the image. In such embodiments, the data in depth buffer 394 is read by host system 310 after source image 500 is stored in frame buffer 390 in order to calculate a blending factor for each pixel. For example, host system 310 may read the contents of depth buffer 394 to a temporary array in host system 310. Processor 312 is then used to replace the depth component values stored in the temporary array with the blending factor values obtained for example, form a lookup table stored in host system 310, which may be part of depth-of-field simulator 314. After each depth component value in the temporary array has been replaced with its appropriate blending factor value, the contents of the temporary array is written to the alpha color component values of the image stored in frame buffer 390.

In a third embodiment, depth-dependent calculator 364 may again reside in pixel operations module 360. In such embodiments, source image 500 might be transferred to frame buffer 390 in step 410 without the blending factor for each pixel being calculated and stored in frame buffer 390 as the alpha component value of the image. In such embodiments, the data in depth buffer 394 is read by host system 310 after source image 500 is stored in frame buffer 390 in order to calculate a blending factor for each pixel. For example, host system 310 may read the contents of depth buffer 394 to a temporary array in host system 310. The contents of the temporary array is then written to the alpha color component values of the image stored in frame buffer 390. As the alpha color component values are transferred to frame buffer 390, they pass through pixel operation module 360. As the alpha color component values pass through pixel operation module 360, depth-dependent calculator 364 looks up a corresponding blending factor for each pixel using the value in the pixel's alpha component as its input. After the blending factor for a particular pixel is determined by depth-dependent calculator 364, the blending factor is stored in the pixels alpha color component. Thus in a third embodiment of the present invention, host system 310 transfers depth component values to alpha component values while pixel operations module 360 obtains the final blending factors and writes them to the alpha component of the image in frame buffer 390.

Additional means for determining a blending factor for each pixel of a source image will be apparent to a person skilled in the relevant art given the discussion herein.

Figure 8A:
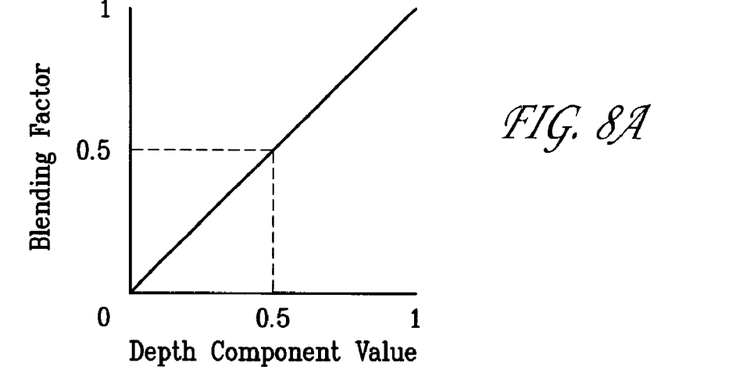
FIGS. 8A–C illustrate example depth-of-field functions in accordance with embodiments of the present invention.
Figure 8B:
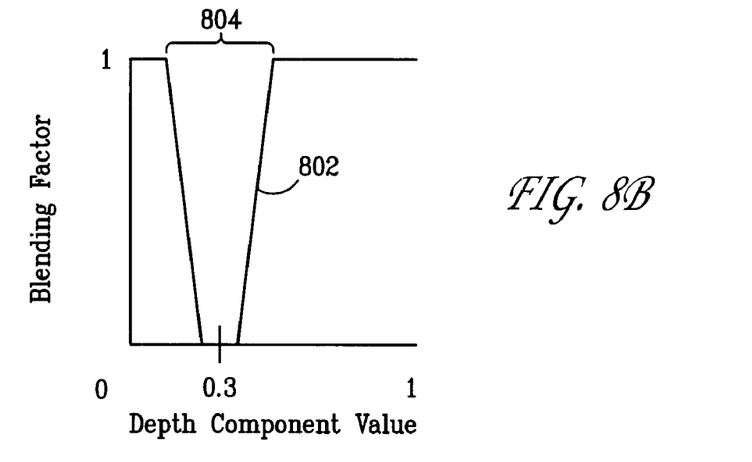
Figure 8C:
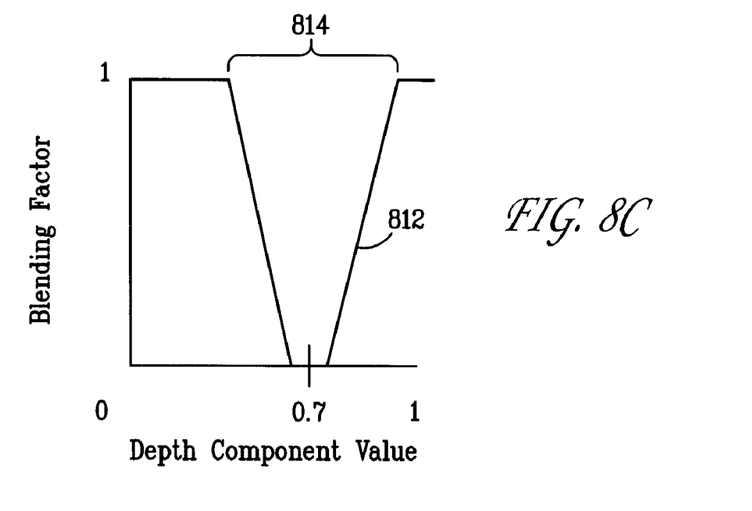

FIGS. 8A–C illustrate example depth-of-field functions, in accordance with the present invention, that can be used to determine a blending factor for each pixel of source image 500. These example depth-of-field functions can be implemented according to the present invention as either a lookup table or as a preprogrammed algorithm. By comparing the functions illustrated in FIGS. 8A–C, it will become apparent to a person skilled in the relevant art given the discussion herein just how usefully and flexibly the present invention is for simulating camera depth-of-field effects in an image.

FIG. 8A illustrates a linear function. As can be seen in FIG. 8A, the value of the blending factor is identical to the value of the depth component. This function can be implemented, for example, by simply copying the depth component value of a pixel to the pixel's alpha channel or component. The function of FIG. 8A can be implemented without using a lookup table.

FIG. 8B illustrates a more complicated function. The function illustrated in FIG. 8B can be used to simulate camera depth-of-field effects, wherein the pixels of an image having a depth component value of about 0.3 would appear to be in focus (i.e., the pixels would appear to be in the focal plane of a camera) while pixels having a depth component value of 0.7, for example, would appear to be out of focus.

As would be apparent to a person skilled in the relevant art, the function illustrated in FIG. 8B be adjusted, for example, by changing the slope of line 802, by changing the width of gap 804, and by changing the depth component values that correspond to a blending factor of zero. Adjusting these various aspects of the function illustrated in FIG. 8B will change the simulated camera depth-of-field effect in an image. For example, changing the depth component values that correspond to a blending factor of zero is equivalent to adjusting the focal length of a camera's lens. How to adjust the function illustrated in FIG. 8B to obtain a desired simulated camera depth-of-field effect in an image would be known to a person skilled in the relevant art given the discussion herein.

FIG. 8C illustrates another example function that can be used to simulate camera depth-of-field effects in an image. The function illustrated in FIG. 8C is similar to the function illustrated in FIG. 8B. It should be noted, however, that the function illustrated in FIG. 8C has a line 812 that has a steeper slope than line 802 in FIG. 8B, and it has a gap 814 that is wider than gap 804 in FIG. 8B. In addition, the depth component values that correspond to a blending factor of zero have been adjusted in FIG. 8C to about 0.7 as compared to the about 0.3 value in FIG. 8B.

The example functions in FIGS. 8A–8C are illustrative and not intended to limit the present invention. In general, any type of function, including linear and non-linear functions, can be used depending upon a particular effect that is desired by a user.

Figure 6:
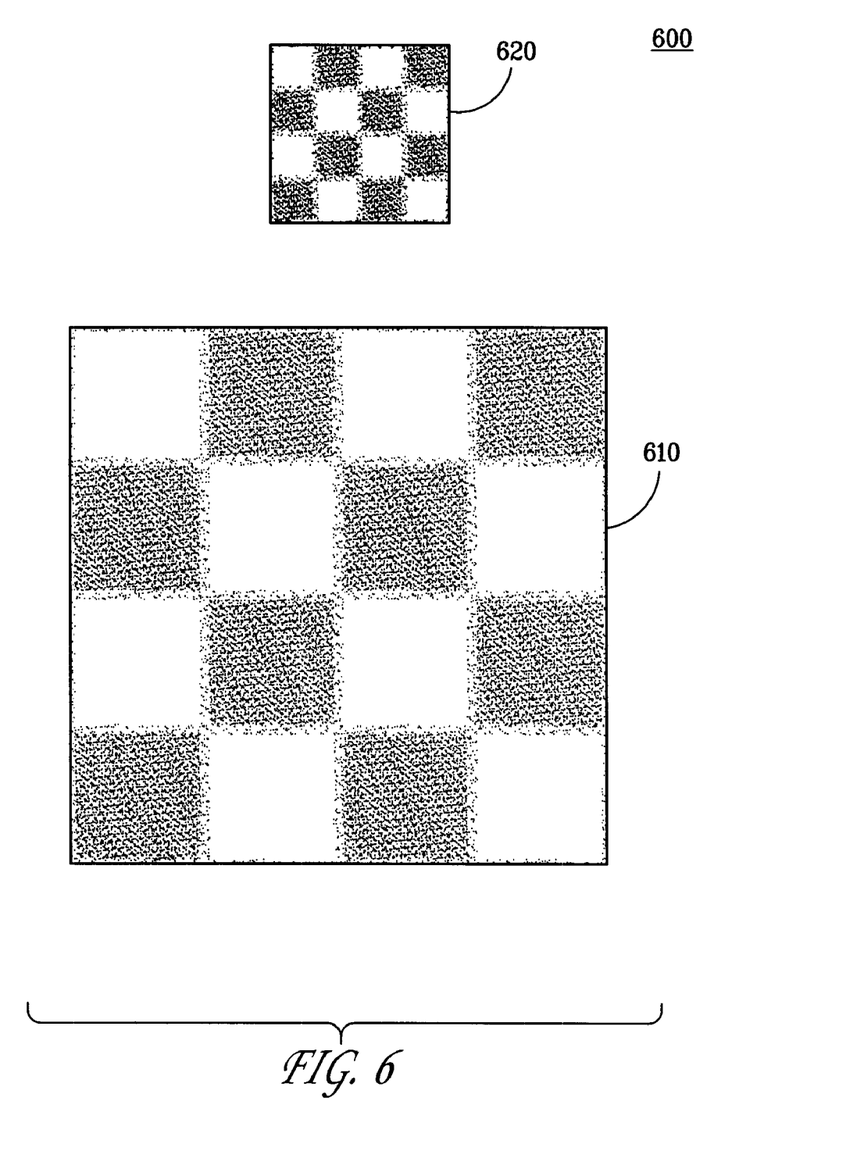
FIG. 6 illustrates a blurred copy of the source image of FIG. 5 according to an embodiment of the present invention.

Referring to FIG. 4 again, in step 430 of method 400 a blurred copy of source image 500 is generated. FIG. 6 illustrates an example blurred copy of source image of 500 (i.e., blurred image 600 with blurred sub-images 610 and 620) according to an embodiment of the present invention.

In an embodiment of the present invention, blurred image 600 is generated by reading source image 500 from frame buffer 390 into pixel operation module 360 and applying a filter or convolution kernel residing in convolution module 362 to the pixels of source image 500. In an embodiment, a predefined box filter is convolved with source image 500 to generated blurred image 600. The present invention is not limited to just box filters, however. In an embodiment, blurred image 600 is generated by operating on the pixels of source image 500 with the following 5×5 box filter A:

[1/25, 1/25, 1/25, 1/25, 1/25]
[1/25, 1/25, 1/25, 1/25, 1/25]
[1/25, 1/25, 1/25, 1/25, 1/25]
[1/25, 1/25, 1/25, 1/25, 1/25]
[1/25, 1/25, 1/25, 1/25, 1/25]

Applying this 5×5 box filter to the pixels of source image 500 produces blurred image 600. How a filter is applied to an image to produce a blurred image would be known to a person skilled in the relevant art. Also, as would be apparent to a person skilled in the relevant art, other types of box filters, e.g., 3×3 and 7×7 box filters, can be used to generate a blurred image 600.

In another embodiment of the present invention, blurred image 600 is generated using a Gaussian filter. A Gaussian filter is a filter of the type:

[1/10, 1/10, 1/10]
[1/10, 1/5, 1/10]
[1/10, 1/10, 1/10]

When using a Gaussian filter, blurred image 600 is generated in a manner similar to that described about for box filters.

A person skilled in the relevant art will understand, given the description herein, that many other types of filters can be used to generate blurred image 600 from source image 500. The particular filter or filters used to generate each blurred image 600 will depend upon the particular simulated camera depth-of-field effect desired.

In step 440 of method 400, blurred image 600 is blended with source image 500 using the blending factors determined in step 420. In an embodiment of the invention, blending module 382 blends each pixels of source image 500 with its corresponding pixel of blurred image 600 according to EQ. 1 to produce a resultant pixel that is stored in frame buffer 390.

$$P_{Result} = P_{Blurred} \cdot (bf) + P_{source} \cdot (1 - bf) \qquad \text{EQ.1}$$

where:

$P_{result}$ is the pixel stored in frame buffer 390 after the blending operation;

$P_{Blurred}$ is the corresponding pixel from blurred image 600;

$P_{Source}$ is the corresponding pixel from source image 500; and bf is the corresponding blending factor determined in step 420.

Figure 7:
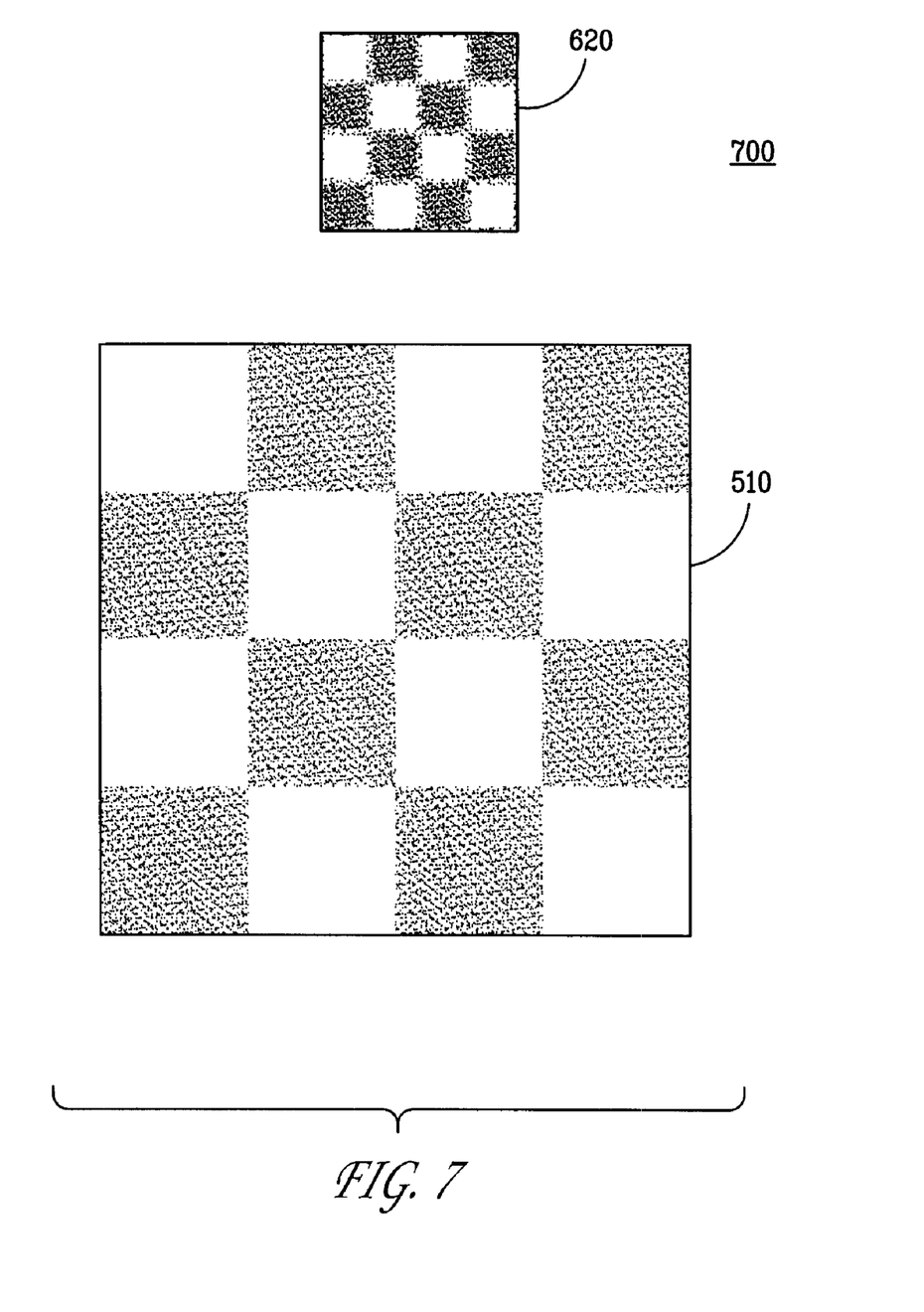
FIG. 7 illustrates an image with simulated camera depth-of-field effects according to an embodiment of the present invention.

FIG. 7 illustrates an image 700 with simulated camera depth-of-field effects that was produced according to an embodiment of present invention. The pseudo-code listed in Table 1 illustrates one means according to the present invention for generate image 700.

TABLE 1

```
render_scene_with_depth_of_field ( )
{
    // Draw geometry to color and depth buffers
    //
    draw_geometry ( );
    // Read depth buffer data to host and draw
    // it to the color buffer's alpha component.
    // Employ a lookup table to store depth to
    // alpha mapping function.
    //
    read_buffer (DEPTH_COMPONENT, tmp_storage _array);
    enable_color_lut (MAP_ALPHA_TO_ALPHA);
    draw_buffer (ALPHA_COMPONENT, tmp_storage_array);
    disable_color_lut (MAP_ALPHA_TO_ALPHA);
    // Copy color buffer containing original rendered
    // image while applying convolution and blend based
    // on alpha component we just drew to. Assume
    // box_filter_array is predefined and contains the
    // data for a standard box filter.
    //
    enable_blend (LINEAR_COMBINATION);
    enable_convolution (CONVOLVE_RGB_COMPONENT,
        box_filter_array);
    copy_buffer (RGB_COMPONENT);
    disable_blend ( );
    disable_convolution ( );
}
```

The pseudo-code in Table 1 can be implemented, for example, using the OpenGL™ software interface to graphics hardware. How to implement the pseudo-code in Table 1 would be known to a person skilled in the relevant art.

The following description further illustrates a means for simulating camera depth-of-field effects in an image 700. To generate image 700, in an embodiment of the invention, source image 500 is first transferred to frame buffer 390. As illustrated in FIG. 5, source image 500 comprises two sub-images 510 and 520. The depth component value for each pixel of sub-image 510 is 0.3. The depth component value for each pixel of sub-image 520 is 0.7. In this example embodiment, source image 500 is transferred to frame buffer 390 without determining a blending factor for each pixel of source image 500.

To determine a blending factor for each pixel of source image 500, depth buffer 394 is read into a temporary storage array in host system 310. The contents of the temporary storage array are then written to the alpha component values of the image in frame buffer 390. As the alpha color component values are transferred to color buffer 392, they pass through pixel operation module 360. As the alpha color component values pass through pixel operation module 360, depth-dependent calculator 364 obtains a blending factor for each pixel using a lookup table. For example, a lookup table which implements the function illustrated in FIG. 8B would assign a blending factor of zero to each pixel of sub-image 520 and a blending factor of one to each pixel of sub-image 520. Once a blending factor for each pixel has been determined, pixel operations module 360 writes the blending factors to the alpha channel of color buffer 392. At this stage, source image 500 is stored in frame buffer 390, and the blending factor for each pixel of source image 500 is stored in the corresponding pixels alpha color channel.

Source image 500 is next read from frame buffer 390 into pixel operation module 360 in order to generated a blurred copy of source image 500. As previously described, blurred image 600 can be generated by convolution module 362 using 5×5 box filter A. In this example embodiment of the invention, 5×5 box filter A is a predefined box filter, which resides in convolution module 362. As seen in FIG. 6, blurred image 600 also has two sub-images 610 and 620 which correspond to the respective sub-images 510 and 520 in FIG. 5.

The last step in generating image 700, is to blend blurred image 600 with source image 500 using EQ.1. As discussed above, the blending factors to be used in this example embodiment are the blending factors determined by the function illustrated in FIG. 8B. As will be apparent to a person skilled in the relevant art, the blending of sub-images 510 and 610, wherein the blending factor for each pixel of sub-image 510 is zero, results in an image that looks identical to sub-image 510. Similarly, as will be apparent to a person skilled in the relevant art, the blending of sub-images 520 and 620, wherein the blending factor for each pixel of sub-image 520 is one, results in an image that looks identical to sub-image 620. Thus, the result of blending source image 500 with blurred image 600, in this example embodiment, is an image 700 that comprises sub-images 510 and 620, as illustrated in FIG. 7.

As will be apparent to a person skilled in the relevant art, given the discussion herein, using a different function to determine the blending factor for each pixel of source image 500 in the above example embodiment would result in a different image 700. Using different functions to simulate different camera depth-of-field effect is part of the claimed invention.

Figure 9:
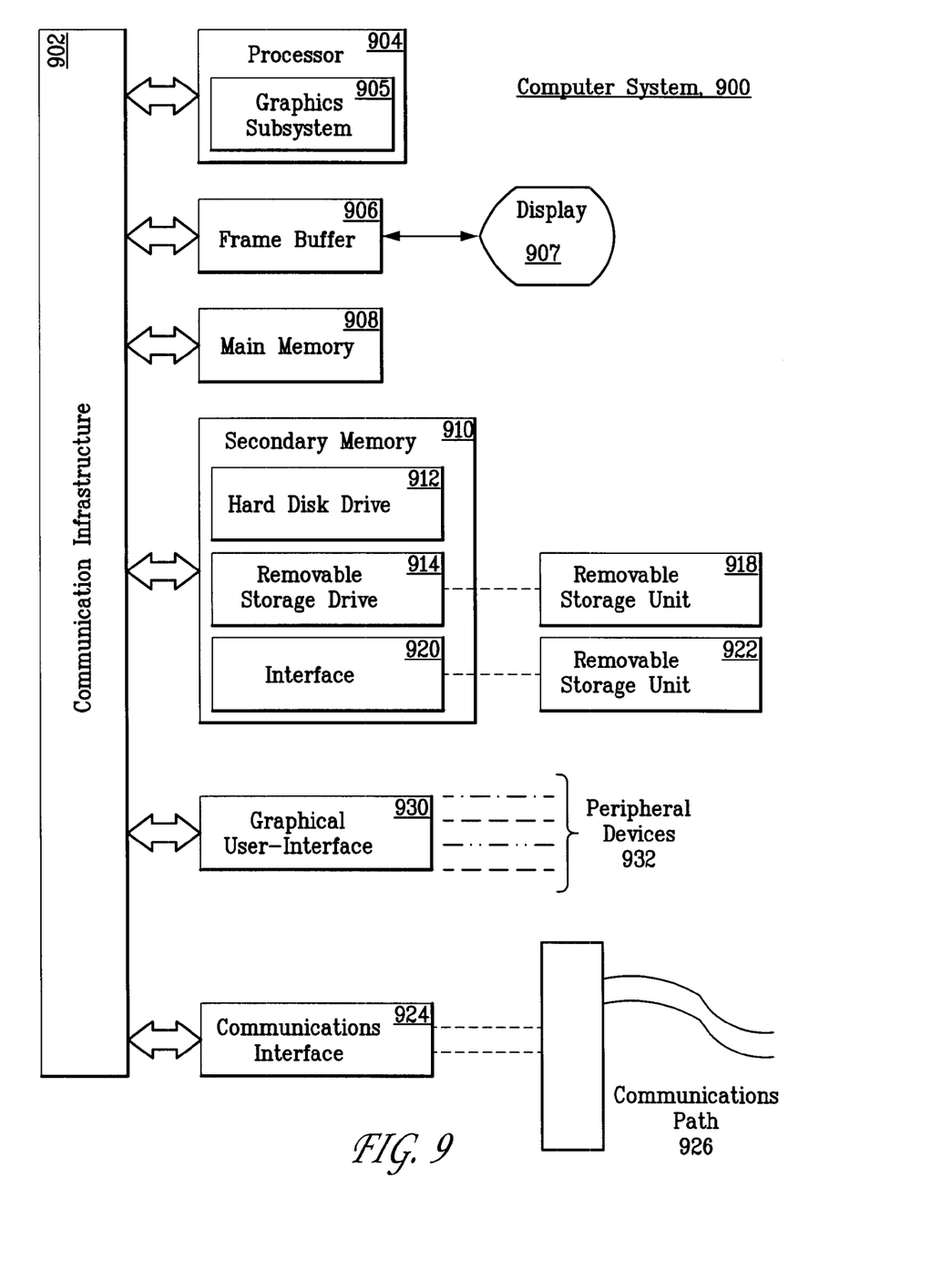
FIG. 9 illustrates an example computer system that can implement embodiments of the present invention.

Example Computer System for Implementing Computer Program Product Embodiments of the Invention Referring to FIG. 9, an example of a computer system 900 is shown, which can be used to implement computer program product embodiment of the present invention. This example computer system is illustrative and not intended to limit the present invention. Computer system 900 represents any single or multi-processor computer. Single-threaded and multi-threaded computers can be used. Unified or distributed memory systems can be used.

Computer system 900 includes one or more processors, such as processor 904, and one or more graphics subsystems, such as graphics subsystem 905. One or more processors 904 and one or more graphics subsystems 905 can execute software and implement all or part of the features of the present invention described herein. Graphics subsystem 905 can be implemented, for example, on a single chip as a part of processor 904, or it can be implemented on one or more separate chips located on a graphic board. Each processor 904 is connected to a communication infrastructure 902 (e.g., a communications bus, cross-bar, or network). After reading this description, it will become apparent to a pet-soil skilled in the relevant art how to implement the invention using other computer systems and/or computer architectures.

Computer system 900 also includes a main memory 908, preferably random access memory (RAM), and can also include secondary memory 910. Secondary memory 910 can include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918 represents a floppy disk, magnetic tape, optical disk, etc., which is read by and written to by removable storage drive 914. As will be appreciated, the removable storage unit 918 includes a computer usable storage medium having stored therein computer software and/or data.

In alternative embodiments, secondary memory 910 may include other similar means for allowing computer programs or other instructions to be loaded into computer system 900. Such means can include, for example, a removable storage unit 922 and an interface 920. Examples can include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

In an embodiment, computer system 900 includes a frame buffer 906 and a display 907. Frame buffer 906 is in electrical communication with graphics subsystem 905. Images stored in frame buffer 906 can be viewed using display 907.

Computer system 900 can also include a communications interface 924. Communications interface 924 allows software and data to be transferred between computer system 900 and external devices via communications path 926. Examples of communications interface 924 can include a modem, a network interface (such as Ethernet card), a communications port, etc. Software and data transferred via communications interface 924 are in the form of signals which can be electronic, electromagnetic, optical or other signals capable of being received by communications interface 924, via communications path 926. Note that communications interface 924 provides a means by which computer system 900 can interface to a network such as the Internet.

Computer system 900 can include one or more peripheral devices 932, which are coupled to communications infrastructure 902 by graphical user-interface 930. Example peripheral devices 932, which can from a part of computer system 900, include, for example, a keyboard, a pointing device (e.g., a mouse), a joy stick, and a game pad. Other peripheral devices 932, which can form a part of computer system 900 will be known to a person skilled in the relevant art given the discussion herein.

The present invention can be implemented using software running (that is, executing) in an environment similar to that described above with respect to FIG. 9. In this document, the term "computer program product"is used to generally refer to removable storage unit 918, a hard disk installed in hard disk drive 912, or a carrier wave or other signal carrying software over a communication path 926 (wireless link or cable) to communication interface 924. A computer useable medium can include magnetic media, optical media, or other recordable media, or media that transmits a carrier wave. These computer program products are means for providing software to computer system 900.

Computer programs (also called computer control logic) are stored in main memory 908 and/or secondary memory 910. Computer programs can also be received via communications interface 924. Such computer programs., when executed, enable the computer system 900 to perform the features of the present invention as discussed herein. In particular, the computer programs, when executed, enable the processor 904 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912 or communications interface 924. Alternatively, the computer program product may be downloaded to computer system 900 over communications path 926. The control logic (software), when executed by the one or more processors 904, causes the processor(s) 904 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to a person skilled in the relevant art.

Conclusion

Various embodiments of the present invention have been described above, which are independent of image complexity and are capable of being implemented on an interactive graphics machine. It should be understood that these embodiments have been presented by way of example only, and not limitation. It will be understood by those skilled in the relevant art that various changes in form and details of the embodiments described above may be made without departing from the spirit and scope of the present invention as defined in the claims. Thus, the breadth and scope of the present invention should not be limited by any of the above-described exemplary embodiments, but should be defined only in accordance with the following claims and their equivalents.

What is claimed is:

1. A method for simulating camera depth-of-field effects in an image, comprising the steps of:

(a) transferring a source image having a plurality of pixels to a frame buffer, each of the plurality of pixels having a color component and a depth component;

(b) determining a blending factor for each of the plurality of pixels based upon the depth component of each of the plurality of pixels;

(c) generating a blurred copy of the source image; and (d) blending the blurred copy of the source image with the source image using the blending factors determined in step (b).

2. The method of claim 1, wherein step (b) comprises the step of using the depth component of each of the plurality of pixels as the blending factor for each of the plurality of pixels.

3. The method of claim 1, wherein step (b) comprises the step of calculating the blending factor for each of the plurality of pixels based upon the depth component of each of the plurality of pixels.

4. The method of claim 3, wherein step (b) comprises the step of obtaining the blending factor for each of the plurality of pixels from a look-up table based upon the depth component of each of the plurality of pixels.

5. The method of claim 1, wherein step (c) comprises the step of operating on the source image with a filter.

6. The method of claim 5, wherein step (c) comprises the step of operating on the source image with a box filter.

7. The method of claim 5, wherein step (c) comprises the step of operating on the source image with a Gaussian filter.

8. The method of claim 1, wherein steps (a) through (d) are performed at an interactive rate.

9. A system for simulating camera depth-of-field effects in an image, comprising:

means for transferring a source image to a frame buffer;

means for determining a blending factor for a pixel of said source image;

means for generating a blurred copy of said source image; and means for blending a pixel of said blurred copy of said source image with the pixel of said source image.

10. The system of claim 9, wherein said means for transferring a source image to a frame buffer, comprises:

a host system; and a graphics subsystem coupled to said host system and said frame buffer.

11. The system of claim 9, wherein said means for determining a blending factor for a pixel of said source image, comprises:

means for determining a depth component value of said pixel; and means for looking up said blending factor in a lookup table using said depth component value.

12. The system of claim 9, wherein said means for generating a blurred copy of said source image, comprises:

means for convolving said source image with a filter.

13. The system of claim 9, wherein said means for generating a blurred copy of said source image, comprises:

means for convolving said source image with a box filter.

14. The system of claim 9, wherein said means for generating a blurred copy of said source image, comprises:

means for convolving said source image with a Gaussian filter.

15. A computer program product comprising a computer useable medium having computer program logic recorded thereon for enabling a processor to simulate camera depth-of-field effects in an image said computer program logic comprising:

means that enables the processor to transfer a source image having a plurality of pixels to a frame buffer, each of the plurality of pixels having a color component and a depth component;

means that enables the processor to determine a blending factor for each of the plurality of pixels based upon the depth component of each of the plurality of pixels;

means that enables the processor to generate a blurred copy of the source image; and means that enables the processor to blend the blurred copy of the source image with the source image using the blending factors determined by said means that enables the processor to determine a blending factor.

16. The computer program product of claim 15, wherein said means that enables the processor to determine a blending factor comprises means for copying a depth component a pixel to a color channel of the pixel.

17. The computer program product of claim 15, wherein said means that enables the processor to determine a blending factor comprises means for calculating the blending factor for each of the plurality of pixels based upon the depth component of each of the plurality of pixels.

18. The computer program product of claim 17, wherein said means that enables the processor to determine a blending factor comprises means for obtaining the blending factor from a look-up table.

19. The computer program product of claim 15, wherein said means that enables the processor to generate a blurred copy of the source image comprises means for operating on the source image with a filter.

20. The computer program product of claim 19, wherein said filter is a box filter.

21. The computer program product of claim 19, wherein said filter is a Gaussian filter.

22. A system for simulating camera depth-of-field effects in an image, comprising:

a host system having a processor;

a frame buffer;

a graphics subsystem coupled to said host system and said frame buffer, said graphics subsystem having a depth-dependent calculator, a convolution module, and a blending module; and a depth-of-field simulator that can direct the operation of said system to simulating camera depth-of-field effects in an image.

23. A system for simulating camera depth-of-field effects in an image, comprising:

a host system having a processor and a depth-dependent calculator;

a frame buffer;

a graphics subsystem coupled to said host system and said frame buffer, said graphics subsystem having a convolution module and a blending module; and a depth-of-field simulator that can direct the operation of said system to simulating camera depth-of-field effects in an image.

24. A method for simulating camera depth-of-field effects in an image having a plurality of pixels, each of the plurality of pixels having a color component and a depth component, comprising the steps of:

(a) determining a blending factor for each of the plurality of pixels based upon the depth component of each of the plurality of pixels;

(b) generating a blurred copy of the image; and (c) blending the blurred copy of the image with the image using the blending factors determined in step (a).

* * * * *